(12) United States Patent
Miller

(10) Patent No.: US 11,534,731 B2
(45) Date of Patent: *Dec. 27, 2022

(54) METHOD FOR INSTALLING A THERMOCOUPLE INSIDE A REACTOR TUBE FILLED WITH CATALYST

(71) Applicant: Air Liquide Large Industries U.S. LP, Houston, TX (US)

(72) Inventor: Gary D. Miller, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 532 days.

This patent is subject to a terminal disclaimer.

(21) Appl. No.: 16/665,315

(22) Filed: Oct. 28, 2019

(65) Prior Publication Data

US 2020/0254412 A1 Aug. 13, 2020

Related U.S. Application Data

(60) Provisional application No. 62/802,860, filed on Feb. 8, 2019.

(51) Int. Cl.
*B01J 4/00* (2006.01)
*B01J 8/00* (2006.01)
(Continued)

(52) U.S. Cl.
CPC ............... *B01J 8/001* (2013.01); *B01J 8/003* (2013.01); *B01J 8/0015* (2013.01); *B01J 8/065* (2013.01);
(Continued)

(58) Field of Classification Search
CPC ..... B01J 4/00; B01J 4/001; B01J 4/005; B01J 8/001; B01J 8/0015; B01J 8/002;
(Continued)

(56) References Cited

U.S. PATENT DOCUMENTS 7,517,147 B2 * 4/2009 Park ..................... B01J 8/06
374/208
7,836,919 B2 * 11/2010 Johns ................ B01J 8/003
422/219
(Continued)

FOREIGN PATENT DOCUMENTS

DE 10 2016 007724 12/2017
WO WO 2011 012875 3/2011

OTHER PUBLICATIONS

International Search Report and Written Opinion for corresponding PCT/US2020/057673, dated Mar. 12, 2021.
(Continued)

*Primary Examiner* — Natasha E Young
(74) *Attorney, Agent, or Firm* — Elwood L. Haynes

(57) ABSTRACT

A method of installing a temperature measuring device inside a reactor tube while filling the tube with catalyst is provided. The method includes inserting a positioning system, including multiple inflatable bladders connected at a central location to a centering ring, into reactor tube, the reactor tube comprising a distal end and a proximal end. Then inserting a temperature measurement device into the centering ring. Locating the positioning system at a first predetermined distance from the distal end. Then inflating the multiple inflatable bladders, thereby centering the centering ring and the temperature measurement device within the SMR tube, and introducing catalyst into the SMR tube, thereby enclosing the temperature measurement device in catalyst.

14 Claims, 7 Drawing Sheets

(51) Int. Cl.
  *B01J 8/02* (2006.01)
  *B01J 8/06* (2006.01)
  *B01J 19/00* (2006.01)
  *B01J 19/24* (2006.01)
  *G01K 1/02* (2021.01)
  *G01K 1/14* (2021.01)
  *G01K 7/02* (2021.01)
  *G21C 17/112* (2006.01)

(52) U.S. Cl.
  CPC ............... *G01K 1/026* (2013.01); *G01K 1/14* (2013.01); *G01K 7/02* (2013.01); *G21C 17/112* (2013.01); *B01J 2208/00061* (2013.01); *B01J 2208/00752* (2013.01)

(58) Field of Classification Search
  CPC ... B01J 8/003; B01J 8/0045; B01J 8/02; B01J 8/0242; B01J 8/025; B01J 8/0257; B01J 8/0285; B01J 8/06; B01J 8/065; B01J 8/067; B01J 19/00; B01J 19/24; B01J 19/2415; B01J 2208/00; B01J 2208/00008; B01J 2208/00017; B01J 2208/00026; B01J 2208/00035; B01J 2208/00044; B01J 2208/00061; B01J 2208/00106; B01J 2208/00168; B01J 2208/00212; B01J 2208/0023; B01J 2208/00743; B01J 2208/00752; B01J 2208/00769; B01J 2208/00778; B01J 2208/06; B01J 2219/00; B01J 2219/24; G01K 1/00; G01K 1/02; G01K 1/026; G01K 1/14; G01K 1/146; G01K 7/00; G01K 7/02; G01K 7/04; G21C 17/00; G21C 17/10; G21C 17/112
  See application file for complete search history.

(56) References Cited

U.S. PATENT DOCUMENTS

| | | | |
|---|---|---|---|
| 9,056,295 B2* | 6/2015 | Brightling | B01J 8/003 |
| 9,573,106 B2* | 2/2017 | Whittenberger | B01J 19/32 |
| 2007/0098605 A1 | 5/2007 | Johns et al. | |
| 2007/0116090 A1 | 5/2007 | Park et al. | |
| 2014/0356109 A1 | 12/2014 | Whittenberger et al. | |
| 2016/0161346 A1* | 6/2016 | Schorb | G01K 1/14 374/161 |
| 2020/0256739 A1* | 8/2020 | Miller | B01J 8/02 |

OTHER PUBLICATIONS

International Search Report and Written Opinion for related PCT/US2020/057688, dated Jan. 15, 2021.
International Search Report and Written Opinion for related PCT/US2020/057694, dated Jan. 14, 2021.
International Search Report and Written Opinion for related PCT/US2020/057705, dated Jan. 14, 2021.

\* cited by examiner

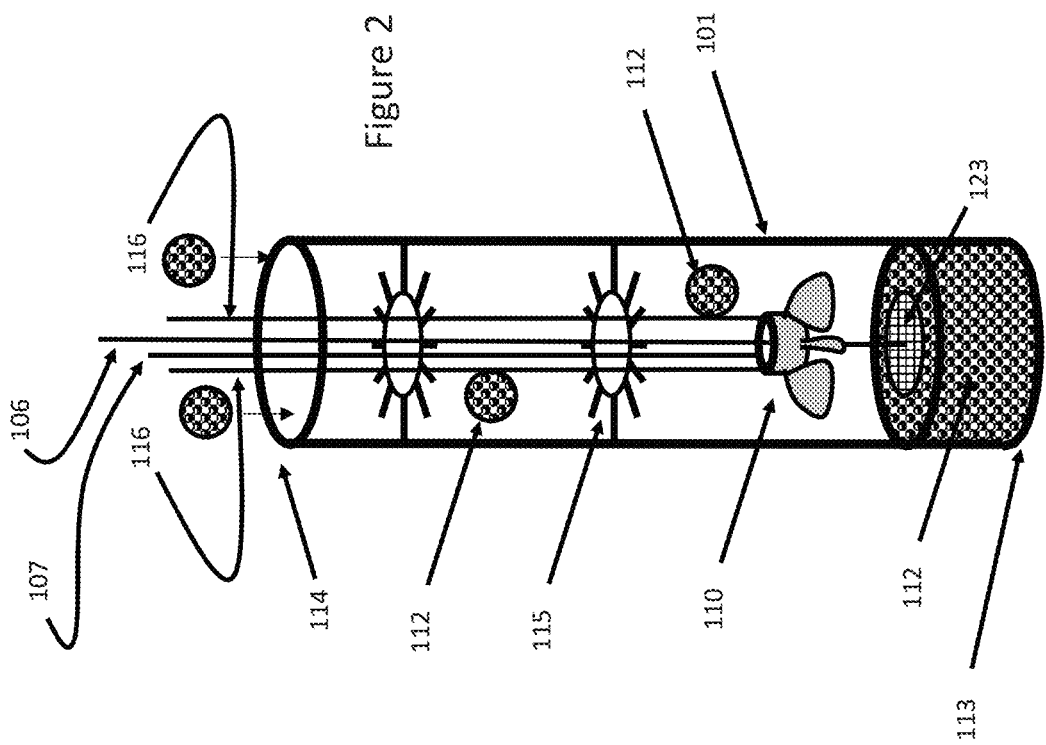
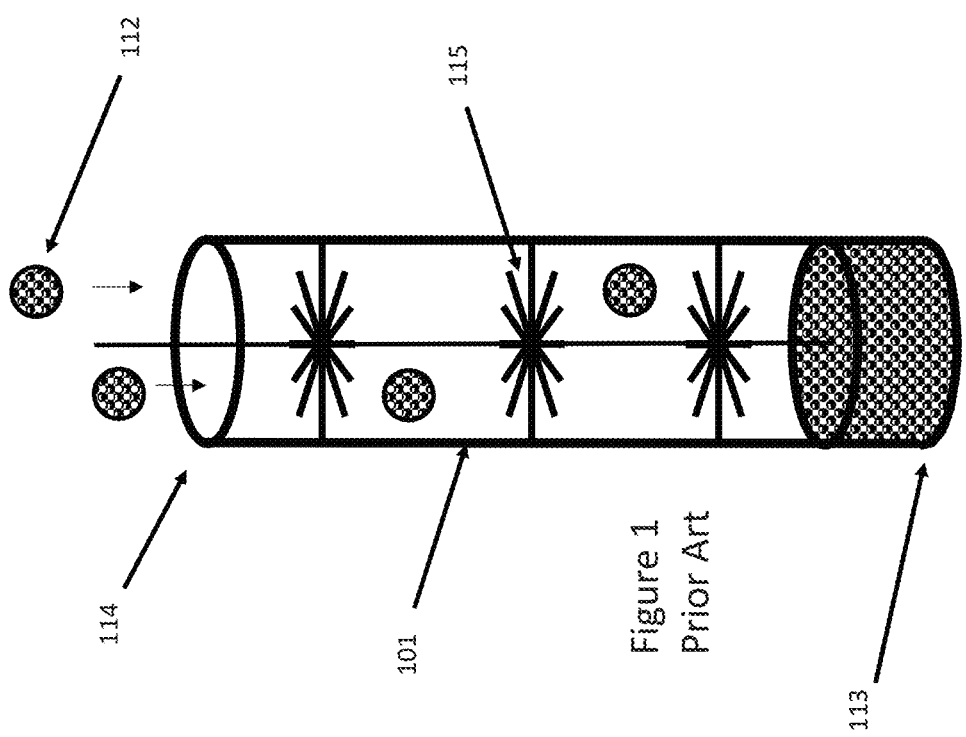

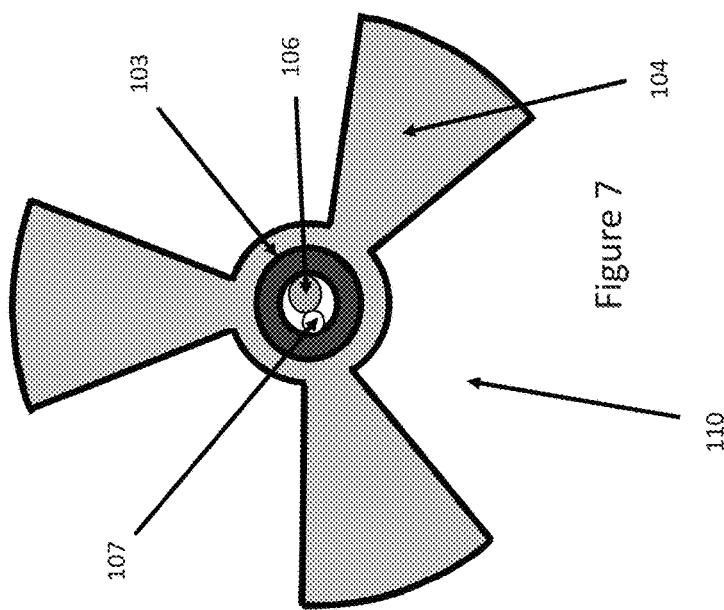
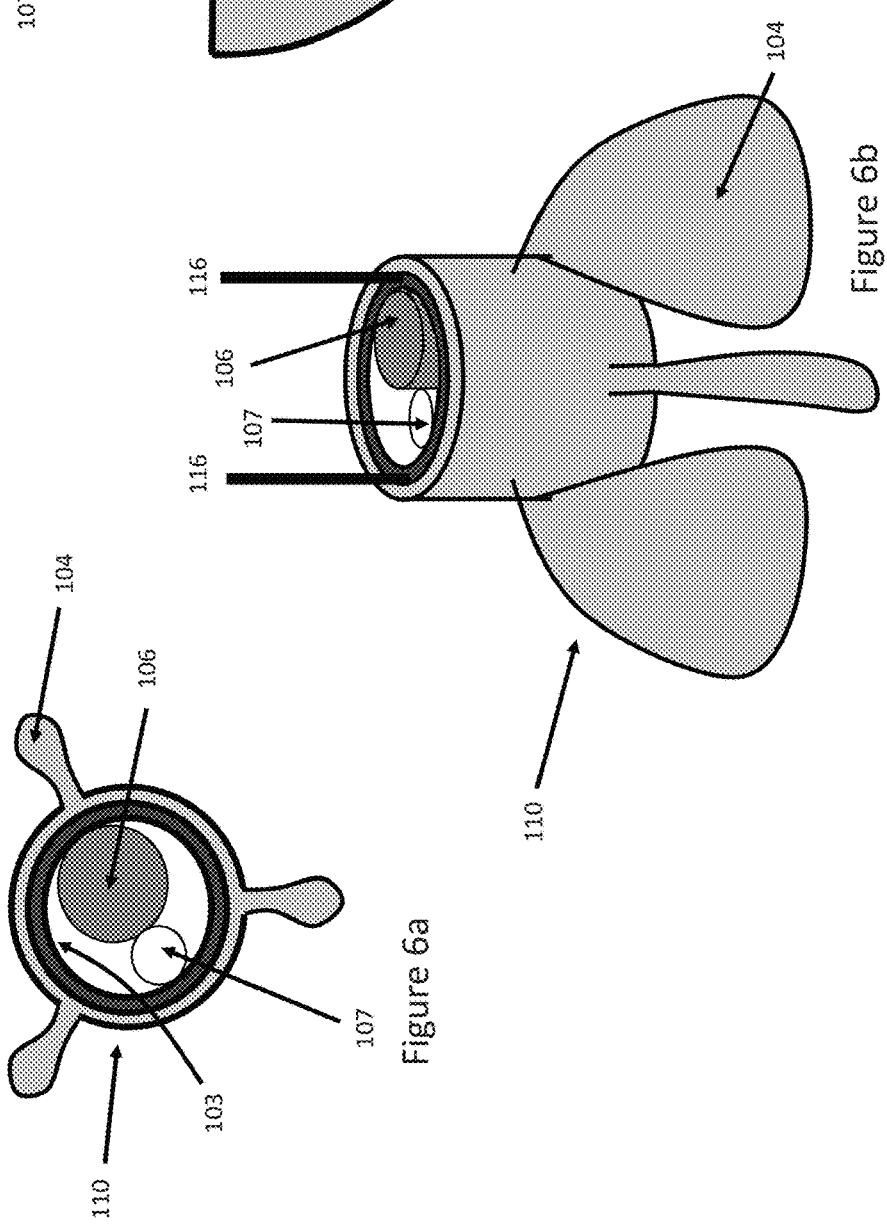

METHOD FOR INSTALLING A THERMOCOUPLE INSIDE A REACTOR TUBE FILLED WITH CATALYST

CROSS REFERENCE TO RELATED APPLICATIONS

This application claims the benefit of priority under 35 U.S.C. § 119 (a) and (b) to U.S. Provisional Application No. 62/802,860, filed Feb. 8, 2019, the entire contents of which are incorporated herein by reference.

BACKGROUND

A steam methane reformer (SMR) is an industrial apparatus that utilizes heat, pressure, and a catalyst to convert methane ($CH_4$) and steam ($H_2O$) into hydrogen ($3H_2$) and carbon monoxide (CO). The $CH_4$ and $H_2O$ react with each other in catalyst-filled tubes that are enclosed within a furnace which provides heat to the endothermic reaction that forms $H_2$ and CO. In order for this endothermic reaction to proceed, a very high furnace temperature is required. Typically, the temperature will be within 700-1,000° C. (1,292-1,832° F.), while the pressure may typically range from 3 to 25 bar.

Some companies manufacture thermocouples that can be inserted into reactor tubes, by which the temperature can be measured along the length of the tube. Knowing this inside-of-SMR-tube temperature is valuable, so that the SMR reaction can be monitored, the process can be optimized, and the tube failure can be predicted.

Installing these inside-of-SMR-tube thermocouples can be challenging because they need to be installed before catalyst is installed around them.

This invention outlines a method by which the inside-of-reactor tube thermocouple is installed and centered, and then catalyst is loaded into the tube afterwards.

SUMMARY

A method of installing a temperature measuring device inside a reactor tube while filling the tube with catalyst is provided. The method includes inserting a positioning system, including multiple inflatable bladders connected at a central location to a centering ring, into a reactor tube, with the reactor tube comprising a distal end and a proximal end. Then inserting a centering ring around the temperature measurement device. Locating the positioning system at a first predetermined distance from the distal end. Then inflating the multiple inflatable bladders, thereby centering the centering ring and the temperature measurement device within the SMR tube, and introducing catalyst into the SMR tube, thereby enclosing the temperature measurement device in catalyst.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein:

FIG. 1 is a schematic representation of a cross-sectional view of a reactor tube and catalyst springs, as known to the art.

FIG. 2 is a schematic representation of a cross-sectional view of a reactor tube and catalyst springs, with the multiple bladder positioning system, in accordance with one embodiment of the present invention.

FIG. 6a is a schematic representation of a cross-sectional view of the uninflated multiple bladder positioning system, accordance with one embodiment of the present invention.

FIG. 6b is a schematic representation of an isometric view of the uninflated multiple bladder positioning system, accordance with one embodiment of the present invention.

FIG. 7 is a schematic representation of a cross-sectional view of the inflated multiple bladder positioning system, accordance with one embodiment of the present invention.

ELEMENT NUMBERS

Figure 3B:
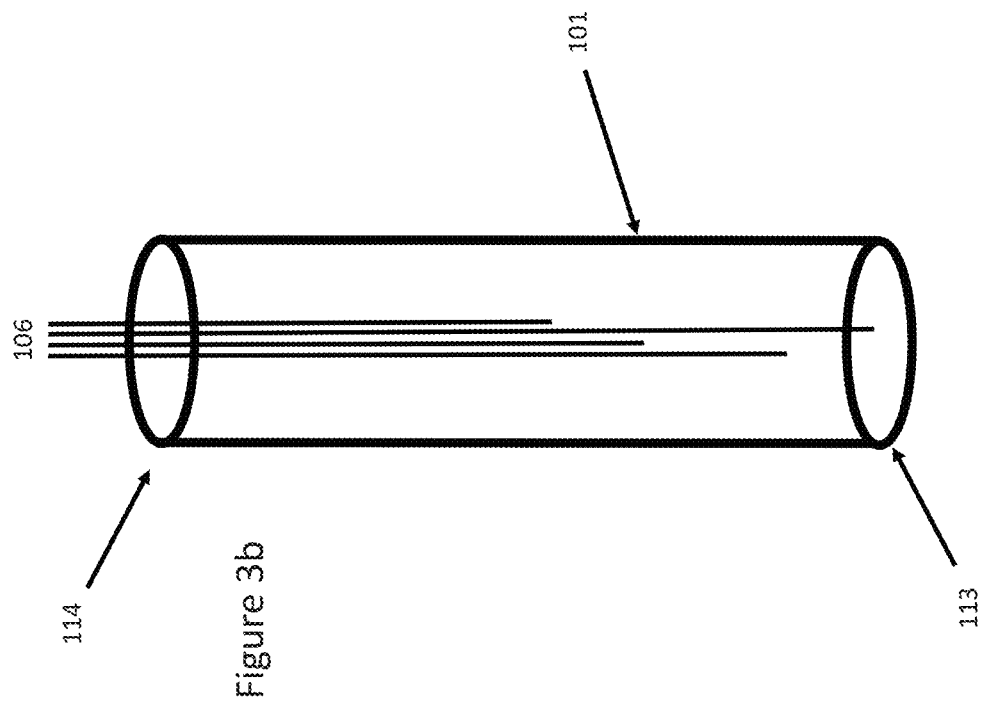
FIG. 3b is a schematic representation of a cross-sectional view of a reactor tube with a strand of multiple temperature measurement devices, in accordance with one embodiment of the present invention.

101=reactor tube (SMR tube)
102=tube inner surface
103=centering ring
104=multiple inflatable bladders
106=temperature measurement device
107=pressurized gas conduit
109=area between multiple inflatable bladders (for catalyst filling)
110=multiple bladder positioning system (including centering ring 103 and multiple inflatable bladders 104)
112=catalyst
113=bottom (distal end) of the reactor tube
114=top (proximal end) of the reactor tube
115=catalyst springs
116=centering ring and catalyst springs tether
117=vibration device 118=compressed gas source
119=compressed gas source valve
122=compressed air bleed valve
123=distal end mesh disk

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The term "about 1 foot" means as close to one foot as is reasonable given the conditions. As used herein, "about 1 foot" is defined as meaning 12 inches plus or minus 20%. Likewise, "about 5 feet" is defined as 60 inches plus or minus 20%.

The term "essentially vertical orientation" means as close to vertical as is reasonable given the conditions. The term "essentially vertical orientation" means sufficiently vertical such that the performance of the instant invention, from the perspective of one with ordinary skill in the art, is the same as if the tubes were precisely vertical. As used herein, 'essentially vertical orientation" is defined as within 10 degrees from true vertical, preferably within 5 degrees of true vertical.

As an overview, a method is provided that uses a dense catalyst loading technique. A centering ring is centered within the reformer tube using multiple inflatable bladders (typically 3) that will allow the catalyst to pass between them through the openings and into the lower empty space of the reactor tube. To start, the bladders are positioned above the tube's catalyst layer. Or, if the tube is completely empty, the bladders are positioned above the end of the tube. The distance above the tube end (or catalyst layer) may vary, but about 12 inches is typical. The bladders are inflated, typically using nitrogen or dry service air. Then a "dense loading" technique is used to introduce the catalyst to just below the height of the bladders. The bladders are then repositioned, typically 1 foot above catalyst layer, and the process is repeated until the tube is fully loaded with catalyst.

FIG. 1 and FIG. 2 represent a cross-sectional view of steam methane reformer (SMR) tube 101 utilizing the instant device and method. Each of at least three inflatable bladders 104 are attached at one end to, and preferably spaced evenly around, the perimeter of centering ring 103. As indicated in FIG. 6a (cross-sectional view, uninflated), Figure Gb (isometric view, uninflated), and FIG. 7 (cross-sectional view, inflated), for ease of explanation, this assembly will be referred to as multiple bladder positioning system 110.

As indicated in Figures Ga, Gb, and 7, within centering ring 103 are at least temperature measurement device 106 and pressurized gas conduit 107. Pressurized gas conduit 107 introduces and evacuates the gas used to inflate and deflate multiple inflatable bladders 104. Pressurized gas conduit 107 connects directly to multiple inflatable bladders 104, thus allowing them to be inflated and deflated.

When inflated (as indicated in FIG. 2), multiple inflatable bladders 104 make at least partial contact with reactor tube wall inner surface 102, and act to locate centering ring 103 centrally within reactor tube wall inner surface 102. Temperature measurement device 106 is located inside of centering ring 103, and after inflation of multiple inflatable bladders 104 is also positioned near the axial center of reactor tube 101. Although only one temperature measurement device 106 is indicated in the figures, it is understood that two or more temperature measurement devices 106 may be located inside centering ring 103 (not shown).

This embodiment may be better understood with reference to FIGS. 2-12.

In a typical catalyst dense loading procedure, radial springs (or brushes) 115 are positioned at a predetermined spacing down the length of reactor tube 101. Reactor tube 101 may be an SMR tube. Springs 115 radiate from a generally central circular ring and act to impede the catalyst as it falls down the length of reactor tube 101. Springs 115 act to slow down the catalyst as it falls and helps prevent the catalyst from being damaged. It is understood that springs 115 may be used along with the instant invention. Springs 115 may be distributed along reactor tube 101, in circular rings above the instant invention. These circular rings encompass temperature measurement device 106 and pressurized gas conduit 107. These rings are sequentially withdrawn as the instant invention moves up reactor tube 101. These circular rings, from which springs 115 emanate, are connected to each other, and to positioning system 110 by tethers 116.

Before the filling of reactor tube 101 with catalyst may commence, the tube is positioned in an essentially vertical orientation, and a sieve has been located at the distal end of the reactor tube, in order to keep the catalyst within the reactor tube. It is preferred that the inside of the tube be inspected to ensure that undesired objects or foreign material not be present. In some cases, a Boroscope (not shown) is used to determine that the inside of the reactor tube is clean.

First, temperature measurement device 106 is attached to distal end mesh disk 123. This helps secure temperature measurement device in place when catalyst 112 is loaded above it. This keeps temperature measurement device 106 from migrating up reactor tube 101 during the subsequent steps.

Figure 3A:
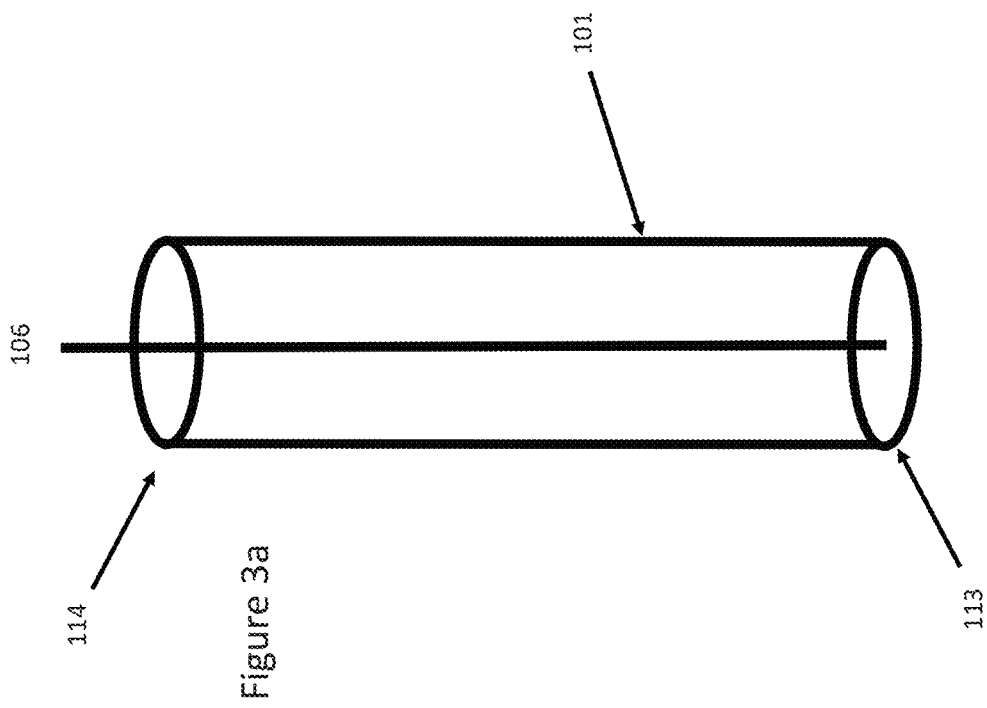
FIG. 3a is a schematic representation of a cross-sectional view of a reactor tube with a single temperature measurement device, in accordance with one embodiment of the present invention.
Figure 5:
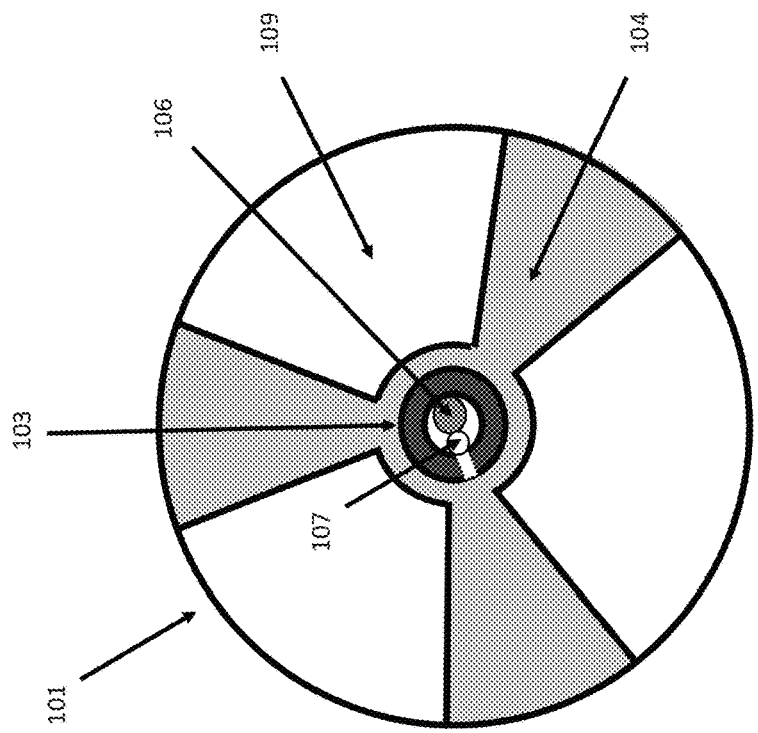
FIG. 5 is a schematic representation of a cross-sectional view of a reactor tube and inflated multiple bladder positioning system, accordance with one embodiment of the present invention.
Figure 4:
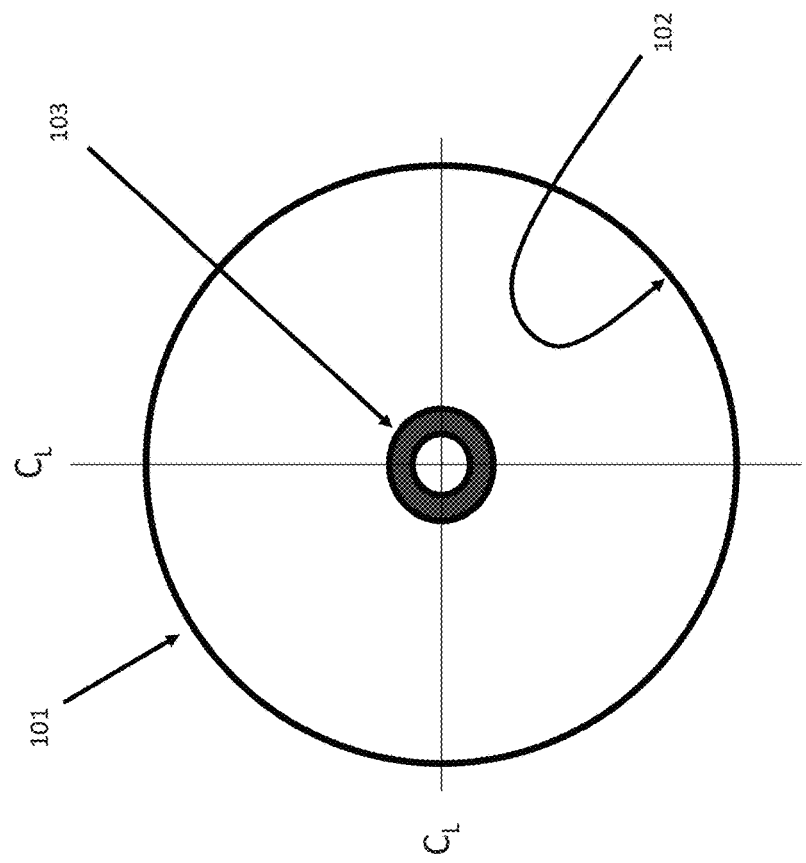
FIG. 4 is a schematic representation of a cross-sectional view of a reactor tube and the centering ring, accordance with one embodiment of the present invention.
Figure 9:
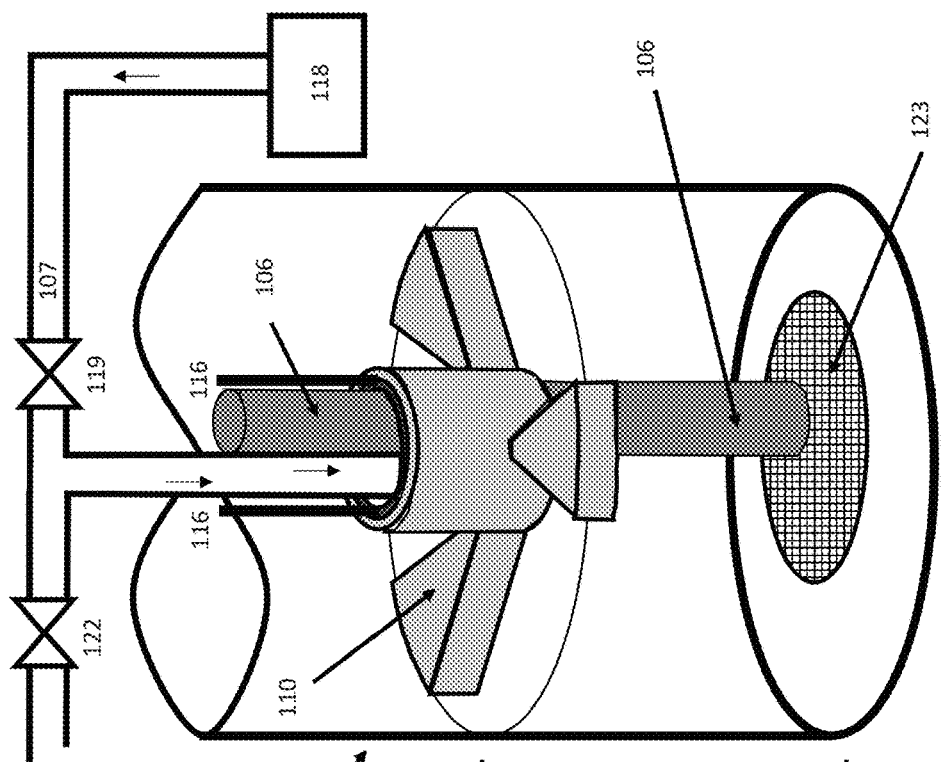
FIG. 9 is a schematic representation of an isometric view of the inflated multiple bladder positioning system located at the bottom of a reactor tube, in accordance with one embodiment of the present invention.
Figure 8:
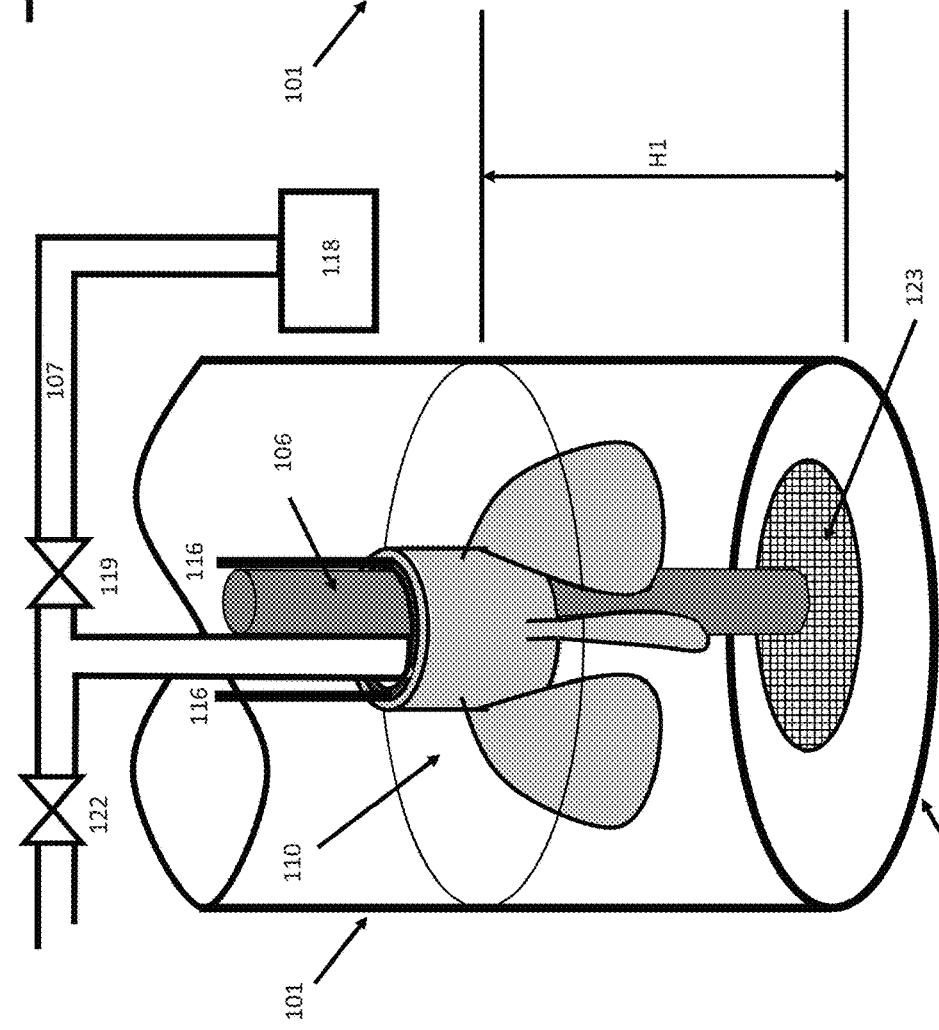
FIG. 8 is a schematic representation of an isometric view of the uninflated multiple bladder positioning system located at the bottom of a reactor tube, in accordance with one embodiment of the present invention.
Figure 11:
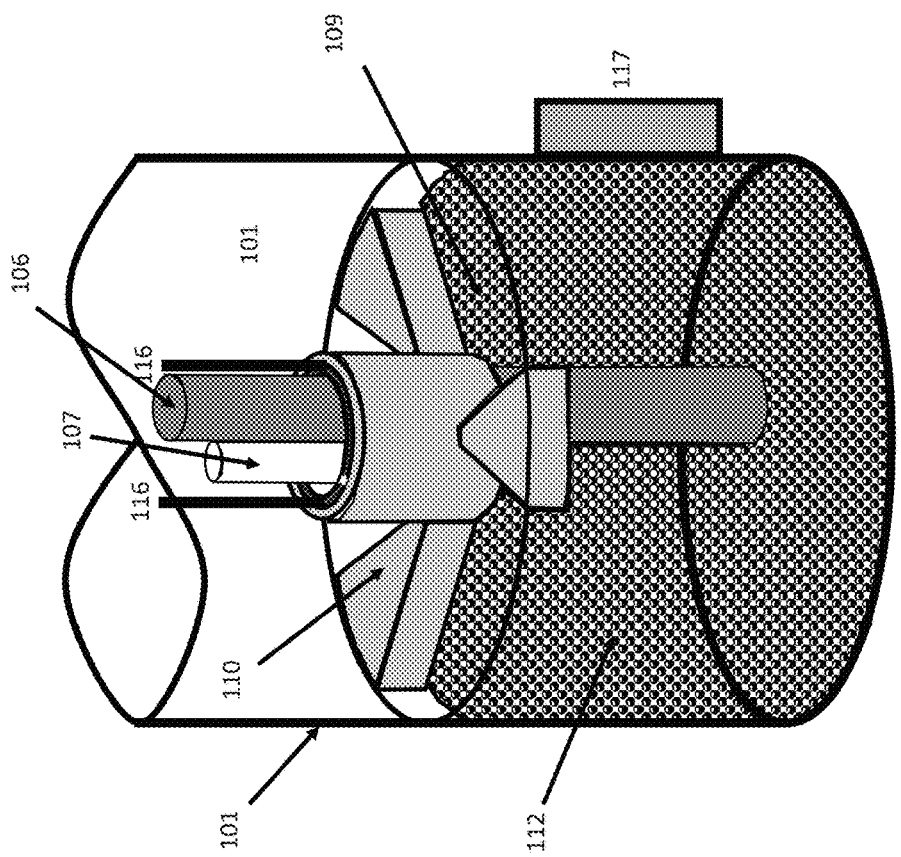
FIG. 11 is a schematic representation of an isometric view of the inflated multiple bladder positioning system located at the bottom of a reactor tube with the catalyst packing complete, accordance with one embodiment of the present invention.
Figure 10:
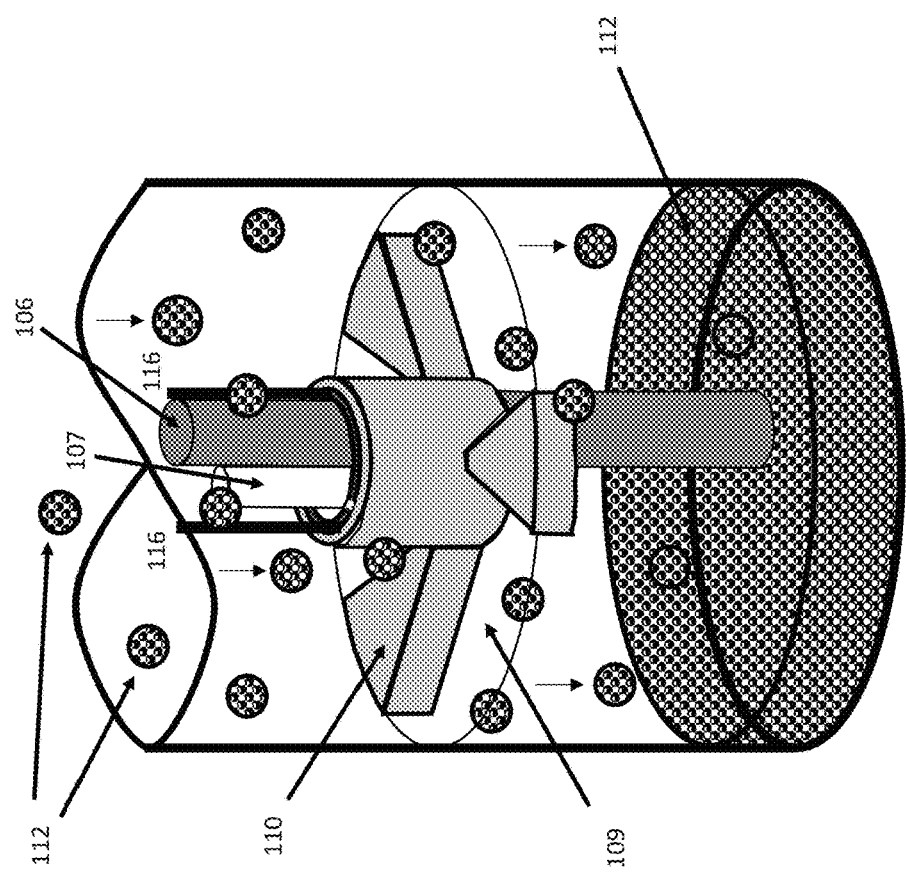
FIG. 10 is a schematic representation of an isometric view of the inflated multiple bladder positioning system located at the bottom of a reactor tube indicating the introduction of catalyst into the tube, accordance with one embodiment of the present invention.
Figure 12:
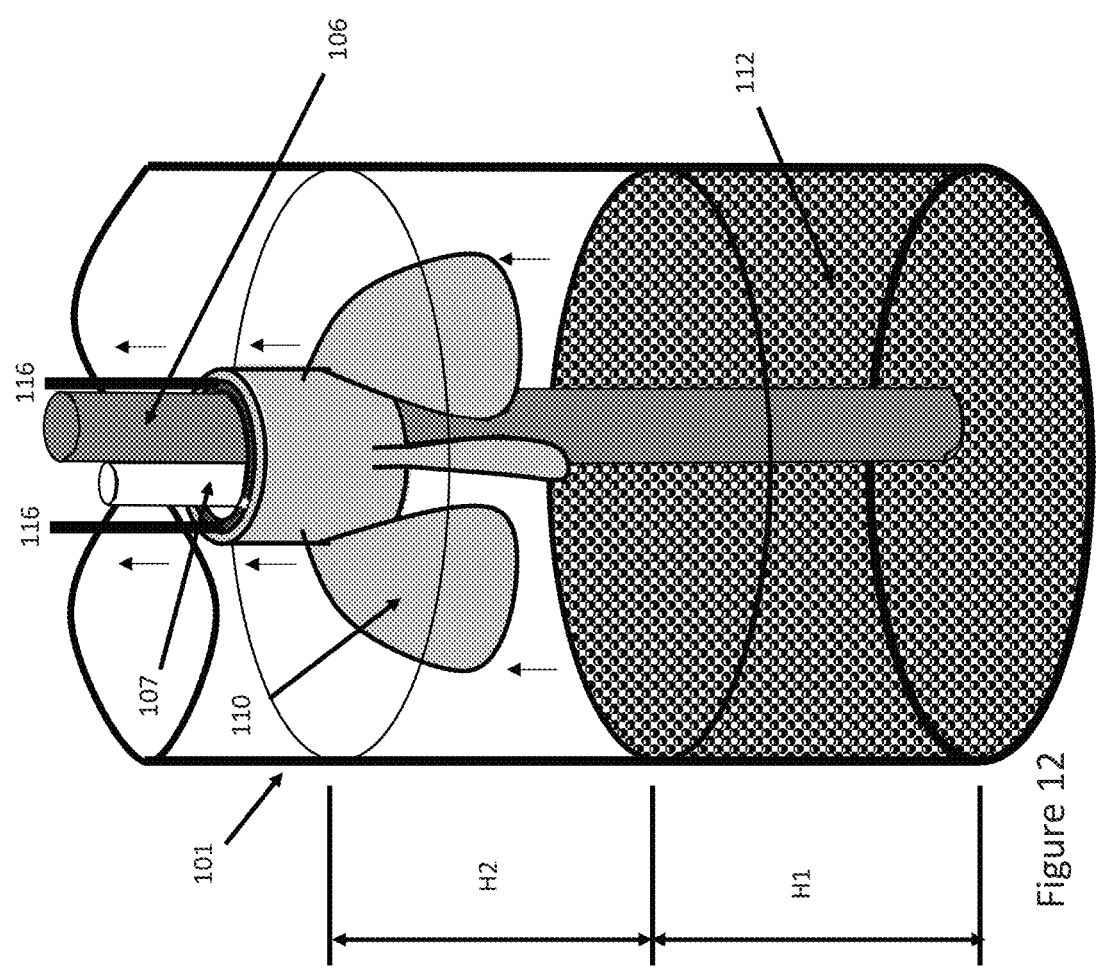
FIG. 12 is a schematic representation of an isometric view of the uninflated multiple bladder positioning system being relocated to the next position within the reactor tube, in accordance with one embodiment of the present invention.

Starting at proximal end 114, temperature measurement device 106 is then inserted down the length of the empty reactor tube. Temperature measurement device 106 and pressurized gas conduit 107 are inserted into the center of centering ring 103, and centering ring tether 116 is attached to centering ring 103. While two centering ring tethers 116 are shown in the figures, temperature measurement device 106 may be fitted with one or multiple centering ring tethers 116. Pressurized gas conduit 107 may be inserted through centering ring 103, or pressurized gas conduit 107 may not be inserted through centering ring 103. Pressurized gas conduit 107 may be left outside centering ring 103 if desired (not shown). Then, while holding and extending centering ring tether 116, lower multiple bladder positioning system 110 into reactor tube 101. Then, lower multiple bladder positioning system 110 until it touches the bottom of reactor tube 101. At this time, it is recommended that centering ring tether 116 is marked to indicate the level at proximal end 114 of the tube, as a point of reference. Temperature measurement device 106 may be any device known to the art, suitable for this purpose. Temperature measurement device 106 may be a single thermocouple as indicated in FIG. 3a. Temperature measurement device 106 may be a strand of multiple thermocouple sensors as indicated in FIG. 3b.

Multiple bladder positioning system 110 is then raised a first distance H1 from the end of reactor tube 101. H1 is entirely discretionary, but a typical value would be about one foot. This distance may be determined from the mark previously made on centering ring tether 116. An additional reference mark may be made at this time on centering ring tether 116 with reference to proximal end 114, to indicate the new location of multiple bladder positioning system 110.

When uninflated, Multiple inflatable bladders 104 are simultaneously inflated, thereby at least partially contacting tube wall inner surface 102 and locating centering ring 103 centrally within reactor tube 101. Any available and suitable compressed gas source 118 may be used for inflating the bladders, such as compressed nitrogen or dry service or plant air.

Temperature measurement device 106, which may be approximately the same length as reactor tube 101, is essentially centered within reactor tube 101. A predetermined, or calculated amount of catalyst 112 is added to reactor tube 101. Catalyst 112 passes through open area 109 between multiple inflatable bladders 104, centering ring 103, and tube wall inner surface 102.

Utilizing a dense loading technique, catalyst 112 may be added at a prescribed filling rate to reactor tube 101 by any such system known in the art. As catalyst 112 is added to reactor tube 101, it falls through the spaces between the multiple inflatable bladders 104 and settles into the void below. In order to promote better catalyst packing, and to help avoid unwanted voids in the catalyst, reactor tube 101 may be vibrated using a vibration device 117 while filling. When an amount sufficient to approximately fill this void has been added, filling stops and multiple inflatable bladders 104 are deflated.

Multiple bladder positioning system 110 is then raised a predetermined distance H2 and the process is repeated. Predetermined distance H2 may be any distance useful or meaningful to the installer, for example three feet. Again, this distance may be determined from the mark previously made on centering ring tether 116, and an additional reference mark may be made at this time on centering ring tether 116. Care must be taken not to overfill with catalyst and covering multiple bladder positioning system 110.

In the second, and subsequent, iterations, catalyst 112 is allowed to fill the space below multiple inflatable bladders 104 as well. This ensures that catalyst 112 fully fills reactor tube 101, and the temperature measurement device 106 remains centered. This process is repeated to the desired location within reactor tube 101, which may be a desired distance from the top of the tube.

Reactor tube 101 is now fully reloaded and full of fresh catalyst, and temperature measurement device 106 is centrally located and able to provide accurate and meaningful readings of temperature along the length of reactor tube 101.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of installing a temperature measuring device inside a reactor tube while filling the tube with catalyst, comprising:
    a) inserting a positioning system, comprising multiple inflatable bladders connected at a central location to a centering ring, into the reactor tube, the reactor tube comprising a distal end and a proximal end,
    b) attaching the temperature measurement device to a distal end mesh disk,
    c) inserting the centering ring around the temperature measurement device,
    d) locating the positioning system at a first predetermined distance from the distal end,
    e) inflating the multiple inflatable bladders, thereby centering the centering ring and the temperature measurement device within the reactor tube, and
    f) introducing catalyst into the reactor tube, thereby enclosing the temperature measurement device in catalyst.

2. The method of claim 1, further comprising:
    a) deflating the multiple inflatable bladders and relocating the positioning system a second predetermined distance toward the proximal end, and
    b) repeating steps b)-f) until the reactor tube is filled as required.

3. The method of claim 1, wherein the positioning system comprises three inflatable bladders.

4. The method of claim 1, wherein the positioning system further comprises multiple open regions, and the catalyst passes through the multiple open regions to enclose the temperature measurement device.

5. The method of claim 4, wherein the positioning system comprises three inflatable bladders and three open regions.

6. The method of claim 1, wherein the temperature measurement device is a thermocouple.

7. The method of claim 1, wherein the temperature measurement device is a stand of multiple thermocouple sensors.

8. The method of claim 1, wherein the multiple inflatable bladders are inflated using pressurized nitrogen.

9. The method of claim 1, wherein the multiple inflatable bladders are inflated using pressurized air.

10. The method of claim 1, wherein the reactor catalyst tube is vibrated during or after step e).

11. The method of claim 1, wherein the first predetermined distance is less than about 5 feet.

12. The method of claim 1, wherein the first predetermined distance is about 1 foot.

13. The method of claim 2, wherein the second predetermined distance is less than about 5 feet.

14. The method of claim 2, wherein the second predetermined distance is about 1 foot.

* * * * *